(12) United States Patent
Zhang et al.

(10) Patent No.: US 12,302,372 B2
(45) Date of Patent: May 13, 2025

(54) FRAME STRUCTURE INDICATING METHOD AND DEVICE, FRAME STRUCTURE DETERMINING METHOD AND DEVICE, STORAGE MEDIUM, AND PROCESSOR

(71) Applicant: ZTE CORPORATION, Shenzhen (CN)

(72) Inventors: Chenchen Zhang, Shenzhen (CN); Feng Bi, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 0 days.

(21) Appl. No.: 18/467,228

(22) Filed: Sep. 14, 2023

(65) Prior Publication Data
US 2024/0008065 A1 Jan. 4, 2024

Related U.S. Application Data

(63) Continuation of application No. 17/054,588, filed as application No. PCT/CN2019/086096 on May 9, 2019, now Pat. No. 11,800,544.

(30) Foreign Application Priority Data

May 11, 2018 (CN) .......................... 201810459922.7

(51) Int. Cl.
*H04W 4/00* (2018.01)
*H04L 5/00* (2006.01)
(Continued)

(52) U.S. Cl.
CPC .......... *H04W 72/53* (2023.01); *H04L 5/0007* (2013.01); *H04W 72/0446* (2013.01); *H04W 72/23* (2023.01); *H04W 76/28* (2018.02)

(58) Field of Classification Search
USPC ................ 370/252, 393, 300, 333, 338, 329
See application file for complete search history.

(56) References Cited

U.S. PATENT DOCUMENTS

| 2016/0143006 A1 | 5/2016 | Ghosh et al. |
| 2017/0126305 A1 | 5/2017 | Viorel et al. |
| (Continued) | | |

FOREIGN PATENT DOCUMENTS

| CN | 102143594 A | 8/2011 |
| CN | 107659528 A | 2/2018 |
| (Continued) | | |

OTHER PUBLICATIONS

Search Report in Chinese Application No. 201810459922.7, mailed Jan. 15, 2024, 6 pages including translation.
Office Action in Chinese Application No. 201810459922.7, dated Jan. 15, 2024, 8 pages including translation.
Office Action in Korean Application No. 10-2023-7010546, dated Nov. 9, 2023, 9 pages including translation.
(Continued)

*Primary Examiner* — Zewdu A Beyen
(74) *Attorney, Agent, or Firm* — Morgan, Lewis & Bockius LLP

(57) ABSTRACT

Provided are method and device for indicating a frame structure. The method includes determining one or multiple first time units; and indicating the frame structure of the one or multiple first time units; wherein a transmission direction on the one or multiple first time units is indicated by the frame structure, the transmission direction comprises downlink transmission, uplink transmission or flexible direction. Further provided are method and device for determining a frame structure, a storage medium, and an electronic device.

17 Claims, 4 Drawing Sheets

(51) Int. Cl.
*H04W 72/0446* (2023.01)
*H04W 72/23* (2023.01)
*H04W 72/53* (2023.01)
*H04W 76/28* (2018.01)

(56) References Cited

U.S. PATENT DOCUMENTS

2018/0288746 A1* 10/2018 Zhang ............... H04L 1/0031
2019/0207730 A1* 7/2019 Park ............... H04J 13/0055

FOREIGN PATENT DOCUMENTS

| CN | 107889123 A | 4/2018 |
| WO | WO-2015/084226 A1 | 6/2015 |
| WO | WO-2015/131749 A1 | 9/2015 |
| WO | WO-2015/176476 A1 | 11/2015 |

OTHER PUBLICATIONS

OPPO "Discussion of resource allocation for IAB", 3GPP TSG RAN WG1 Meeting #92bis, R1-1803990, Sanya, China, Apr. 16-20, 2018, 4 pages.
LG Electronics "Remaining details on Frame Structure", 3GPP TSG RAN WG1 Meeting #87, R1-1611780, Reno, USA, Nov. 14-18, 2016, 6 pages.
Search Report in Chinese Application No. 201810459922.7, mailed Jun. 24, 2024, 9 pages including translation.
Office Action in Chinese Application No. 201810459922.7, dated Jun. 28, 2024, 8 pages including translation.
Zte, "About dynamic indication of data transmission", 3GPP TSG RAN WG1 Meeting #89, R1-1707164, Hangzhou, P.R. China, May 15-19, 2017, 6 pages.
Huawei et al., "Discussion on frame structure for NR", 3GPP TSG RAN WG1 Meeting #85, R1-164032, Nanjing, China, May 23-27, 2016, 8 pages.

* cited by examiner

FRAME STRUCTURE INDICATING METHOD AND DEVICE, FRAME STRUCTURE DETERMINING METHOD AND DEVICE, STORAGE MEDIUM, AND PROCESSOR

CROSS-REFERENCE TO RELATED APPLICATIONS

This is a Continuation application of U.S. patent application U.S. Ser. No. 17/054,588, filed on Nov. 11, 2020, now U.S. Pat. No. 11,800,544, which is a U.S National Stage Application of International Patent Application No. PCT/CN2019/086096, filed on May 9, 2019, which claims priority to Chinese patent application No. 201810459922.7 filed with the China National Intellectual Property Administration (CNIPA) on May 11, 2018, disclosures of which are incorporated herein by reference in their entireties.

TECHNICAL FIELD

Embodiments of the present disclosure relate to the field of communications and, in particular, to method and device for indicating a frame structure, method and device for determining a frame structure, a storage medium, and a processor.

BACKGROUND

In Long Term Evolution Advanced (LTE-A), the use of the relay technology can effectively expand network coverage and improve the cell-edge data rate, and the use of wireless backhaul can avoid the construction of wired transmission networks and facilitate rapid deployment, thereby reducing the construction and operating costs of operators. Therefore, the relay technology is one of the main technologies adopted by the LTE-A system. In the LTE-A relay technology, for the frame structure design, a time-division half-duplex scheme based on a fake MBSFN subframe is adopted. That is, multicast-broadcast single-frequency network (MBSFN) subframe configuration is used: some fake MBSFN subframes are configured for backhaul link transmission, and an access link uses non-MBSFN subframes. In this manner, time-division duplex of a backhaul link and the access link is achieved and is completely transparent to a terminal.

In future 5G or subsequent evolutionary versions, the relay technology will be further utilized. For example, in the integrated access and backhaul (IAB) technology, multi-hop relay will be further supported based on 5G new radio (NR) systems, and a network topology supports redundant connectivity. In such a network topology, system resources may be shared by different types of links and may be multiplexed in a time-division multiplexing (TDM), frequency-division multiplexing (FDM) or space-division multiplexing (SDM) mode. In different multiplexing modes, the frame structures of different types of links may be indicated in a manner different from what is currently defined.

Regarding the problem in the related art that different frame structures cannot be accurately indicated, no effective solution has been proposed yet.

SUMMARY

Embodiments of the present disclosure provide a method and a device for indicating a frame structure, a method and a device for determining a frame structure, a storage medium, and a processor so that at least the problem that different frame structures cannot be accurately indicated in the related art is solved.

Embodiments of the present disclosure provide a method for indicating a frame structure. The method includes: determining one or multiple first time units; and indicating the frame structure of the one or multiple first time units.

Embodiments of the present disclosure provide a method for determining a frame structure. The method includes receiving an indication of the frame structure of one or multiple first time units; and determining the frame structure of the one or multiple first time units according to the indication of the frame structure.

Embodiments of the present disclosure provide a device for indicating a frame structure. The device includes a first determination module configured to determine one or multiple first time units; and an indication module configured to indicate the frame structure of the one or multiple first time units.

Embodiments of the present disclosure provide a device for determining a frame structure. The device includes a receiving module configured to receive an indication of the frame structure of one or multiple first time units; and a second determination module configured to determine the frame structure of the one or multiple first time units according to the indication of the frame structure.

Embodiments of the present disclosure further provide a storage medium. A computer program is stored in the storage medium. When the computer program is executed, the steps in any one of the preceding method embodiments are performed.

Embodiments of the present disclosure further provide an electronic device. The electronic device includes a memory and a processor. A computer program is stored in the memory. The processor is configured to execute the computer program to perform the steps in any one of the preceding method embodiments.

BRIEF DESCRIPTION OF DRAWINGS

The drawings described herein are used to provide a further understanding of the present disclosure and form a part of the present disclosure. Illustrative embodiments and the description thereof are used to explain the present disclosure and are not intended to improperly limit the present disclosure. In the drawings.

DETAILED DESCRIPTION

Figure 1:
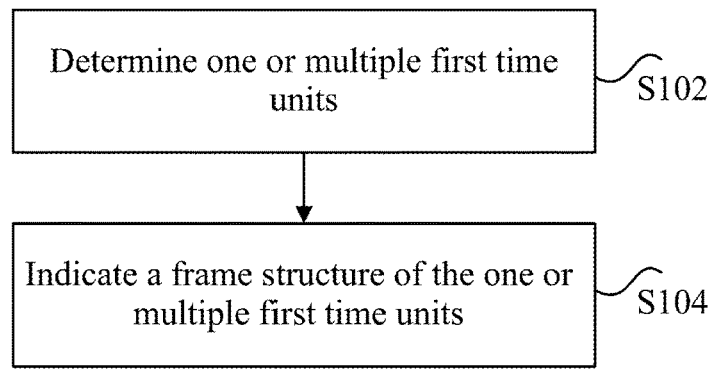
FIG. 1 is an optional flowchart of a method for indicating a frame structure according to an embodiment of the present disclosure.

It is to be noted that the terms "first", "second" and the like in the description, claims and drawings of the present disclosure are used to distinguish between similar objects and are not necessarily used to describe a particular order or sequence. It is to be understood that the data used in this manner is interchangeable under appropriate circumstances so that embodiments of the present disclosure described herein may also be implemented in a sequence not illustrated or described herein. In addition, the terms "include", "have" or any other variations thereof are intended to encompass a non-exclusive inclusion. For example, a process, method, system, product or equipment that includes a series of steps or units not only includes the expressly listed steps or units but may also include other steps or units that are not expressly listed or are inherent to such process, method, product or equipment.

In 5G NR frame structure configuration, both semi-static configuration and dynamic configuration are currently supported. Semi-static configuration supports cell-specific configuration and UE-specific configuration. Dynamic configuration is indicated using a slot format indicator (SFI) carried on group-common Physical Downlink Control Channel (PDCCH). Regardless of semi-static configuration or dynamic configuration, three types are supported in terms of frame structure type: downlink, uplink, and flexible. Different configuration approaches are defined for semi-static cell-specific configuration and UE-specific configuration. For cell-specific configuration, configuration is performed in units of specific periods, and a frame structure in one or two specific periods may be configured. UE-specific configuration is per slot configuration in which a Flexible field in cell-specific configuration can be rewritten. One SFI can indicate a frame structure of one slot or multiple continuous slots, and various slot formats are defined in 5G NR. A base station can semi-statically configure multiple combinations for slot formats for a terminal, and the SFI can indicate one combination for slot formats for one carrier, which includes one or multiple slot formats, respectively indicating the frame structure of one slot or multiple slots.

Embodiments of the present disclosure provide a frame structure indication method embodiment. It is to be noted that steps illustrated in flowcharts in the drawings may be performed by a computer system such as a group of computers capable of executing instructions, and although logical sequences are illustrated in the flowcharts, the illustrated or described steps may be performed in sequences different from those described herein in some cases.

FIG. 1 is a flowchart of a method for indicating a frame structure according to an embodiment of the present disclosure. As shown in FIG. 1, the method includes steps described below.

In S102, one or multiple first time units are determined.

In S104, a frame structure of the one or multiple first time units is indicated.

According to the preceding steps of the present disclosure, one or multiple first time units are determined, and the frame structure including the one or multiple first time units is indicated. In this manner, the problem that different frame structures cannot be accurately indicated in the related art is solved.

It is to be noted that a transmission direction on the one or multiple first time units is indicated by the frame structure. The transmission direction may be, for example, downlink transmission, uplink transmission, or flexible direction.

Optionally, the method further includes that a number of second time units included in the first time unit is predefined by a system; or the number of the second time units included in the first time unit is semi-statically configured by a first node.

Optionally, the method further includes that the multiple first time units are continuous in time domain; or the multiple first time units are discontinuous in time domain.

Optionally, the method further includes that the second time units included in the first time unit are continuous in time domain; or the second time units included in the first time unit are discontinuous in time domain.

Optionally, the method further includes that the frame structure includes one or more first formats.

Optionally, the first time unit includes at least one of a radio frame, a half-frame, a subframe, a slot, an orthogonal frequency-division multiplexing (OFDM) symbol cluster, a mini-slot, or an OFDM symbol, where the OFDM symbol cluster includes multiple OFDM symbols.

Optionally, the second time unit includes at least one of an OFDM symbol cluster, a mini-slot or an OFDM symbol.

Optionally, the method further includes that the number of the one or multiple first time units included in the frame structure is determined in at least one of the following manners: predefinition by a system; semi-static configuration by a first node; or dynamic indication by a second node.

The first node includes at least one of a base station or a relay node. The second node includes at least one of a base station or a relay node.

Optionally, the method further includes that a time domain interval between any two adjacent first time units in the multiple first time units includes at least one of a fixed time domain interval or an unfixed time domain interval. Optionally, the method further includes that the fixed time domain interval is predefined by a system or semi-statically configured by the first node.

Optionally, the method further includes determining the unfixed time domain interval according to a link type.

Optionally, the link type is indicated through the frame structure. The link type includes at least one of a wireless backhaul link; an access link; a non-backhaul link; a non-access link; a direct link; a non-direct link; a link between an a-th hop node and a b-th hop node, where a and b are positive integers greater than or equal to 1; or a link between a first node and a target node, where the first node includes at least one of a base station or a relay node, and the target node includes at least one of a base station, a relay node, or a terminal.

Optionally, the backhaul link includes at least one of a link between a base station and a relay node, or a link between relay nodes.

Optionally, the access link includes a link between a relay node and a terminal, and the direct link includes a link between a base station and a terminal.

Optionally, the method includes determining the first format in at least one of the following manners: predefinition by a system; or semi-static configuration by a first node.

Optionally, a number of the second time units included in the first format is determined in at least one of the following manners: predefinition by a system; or semi-static configuration by a first node.

In embodiments of the present disclosure, through the determination of one or multiple first time units and the indication of the frame structure of the one or multiple first time units, the problem that different frame structures cannot be accurately indicated in the related art is solved, and thus the frame structure of the one or multiple first time units can be indicated.

Figure 2:
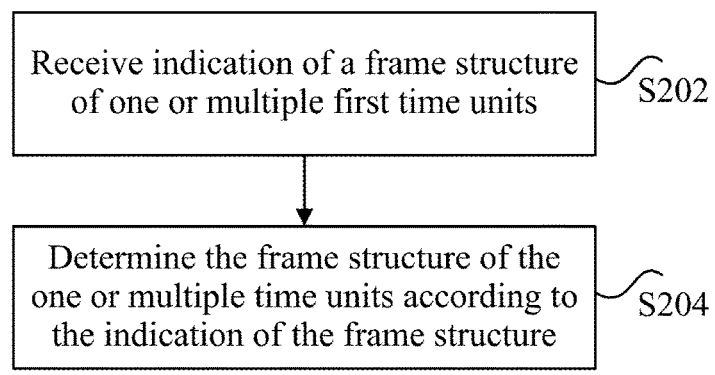
FIG. 2 is an optional flowchart of a method for determining a frame structure according to an embodiment of the present disclosure.

FIG. 2 is a flowchart of a method for determining a frame structure according to an embodiment of the present disclosure. As shown in FIG. 2, the method includes steps described below.

In S202, indication of a frame structure of one or multiple first time units is received.

In S204, the frame structure of the one or multiple first time units is determined according to the indication of the frame structure.

According to the preceding steps of the embodiment of the present disclosure, the indication of the frame structure of the one or multiple first time units is received, and the frame structure of the one or multiple first time units is determined according to the indication of the frame structure. In this manner, the problem that different frame structures cannot be accurately indicated in the related art is solved.

A transmission direction on the one or multiple first time units is indicated by the frame structure. The transmission direction may be, for example, downlink transmission, uplink transmission, or flexible direction. Optionally, the first time unit include one or more second time units. The method further includes acquiring a number of the second time units which is predefined by a system; or receiving the number of the second time units which is semi-statically configured by a first node.

Optionally, the method further includes that the multiple first time units are continuous in time domain; or the multiple first time units are discontinuous in time domain.

Optionally, the method further includes that the second time units included in the first time unit are continuous in time domain; or the second time units included in the first time unit are discontinuous in time domain. Optionally, the method further includes that the frame structure includes one or more first formats.

Optionally, the method further includes that a number of the one or multiple first time units included in the frame structure is determined in one of the following manners: predefinition by a system; semi-static configuration by a first node; or dynamic indication by a second node.

The first node includes at least one of a base station or a relay node. The second node includes at least one of a base station or a relay node.

Optionally, the method further includes that a time domain interval between any two adjacent first time units in the multiple first time units includes at least one of a fixed time domain interval or an unfixed time domain interval.

Optionally, the method further includes acquiring the fixed time domain interval which is predefined by the system or semi-statically configured by the first node.

Optionally, the method further includes determining the unfixed time domain interval according to a link type.

Optionally, an indication of the link type by the frame structure is received.

Optionally, the method includes determining the first format in at least one of the following manners: predefinition by a system; or semi-static configuration by a first node.

Optionally, a number of the second time units included in the first format is received, where the number of the second time units is determined in at least one of the following manners: predefinition by a system; or semi-static configuration by a first node.

From the description of the preceding embodiments, it is apparent to those skilled in the art that the methods in the preceding embodiment may be implemented by software plus a necessary general-purpose hardware platform or may, of course, be implemented by hardware. Based on this understanding, the technical solutions of embodiments of the present disclosure substantially, or the part contributing to the related art, may be embodied in the form of a software product. The computer software product is stored in a storage medium (such as a read-only memory (ROM)/random-access memory (RAM), a magnetic disk or an optical disk) and includes several instructions for enabling a terminal (which may be, for example, a mobile phone, a computer, a server, or a network equipment) to perform the method according to embodiments of the present disclosure.

An embodiment further provides a device for indicating a frame structure. The device is configured to implement the preceding embodiments and optional embodiments. What has been described is not to be repeated. As used below, the term "module" may be software, hardware or a combination thereof capable of implementing a predetermined function. The devices in the embodiments described below are preferably implement by software, but implementation by hardware or by a combination of software and hardware is also possible and conceived.

Figure 3:
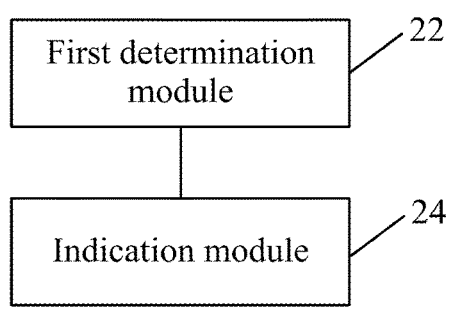
FIG. 3 is an optional block diagram illustrating the structure of a device for indicating a frame structure according to an embodiment of the present disclosure.

FIG. 3 is a block diagram of a device for indicating a frame structure according to an embodiment of the present disclosure. As shown in FIG. 3, the device may include a first determination module 22 used for determining one or multiple first time units; and an indication module 24 used for indicating a frame structure of the one or multiple first time units.

Through a comprehensive effect of each preceding module, the one or multiple first time units are determined, and the frame structure of the one or multiple first time units is indicated. In this manner, the problem that different frame structures cannot be accurately indicated in the related art is solved.

A transmission direction on the one or multiple first time units is indicated by the frame structure. The transmission direction may be, for example, downlink transmission, uplink transmission, or flexible direction. It is to be noted that the determination module 22 in the embodiment may be used for performing S102 in forgoing embodiment of the present disclosure and the indication module 24 in the embodiment may be used for performing S104 in foregoing embodiment of the present disclosure. The examples and application scenarios implemented by the preceding modules and corresponding steps are the same but are not limited to the content disclosed in the preceding embodiments.

Optionally, the first determination module 22 is further used for predefining the number of the second time units included in the first time unit by a system; or further used for semi-statically configuring the number of the second time units included in the first time unit by a first node.

It is to be noted that in the embodiment of the present disclosure, the multiple first time units are continuous in time domain; or the multiple first time units are discontinuous in time domain. The frame structure includes one or more first formats.

It is to be noted that in the embodiment of the present disclosure, the first time unit includes at least one of a radio frame, a half-frame, a subframe, a slot, an OFDM symbol cluster, a mini-slot, or an OFDM symbol, where the OFDM symbol cluster includes multiple OFDM symbols. The second time unit includes at least one of an OFDM symbol cluster, a mini-slot, or an OFDM symbol.

Optionally, the first determination module 22 is further used for that the number of the first time units included in the frame structure is determined in one of the following manners: predefinition by a system; semi-static configuration by a first node; or dynamic indication by a second node.

The first node includes at least one of a base station or a relay node. The second node includes at least one of a base station or a relay node. It is to be noted that in the embodiment of the present disclosure, the multiple first time units are continuous in time domain; or the multiple first time units are discontinuous in time domain. The frame structure includes one or more first formats.

A time domain interval between any two adjacent first time units in the multiple first time units includes at least one of a fixed time domain interval or an unfixed time domain interval.

Optionally, the indication module 24 is used for predefining the fixed time domain interval by a system or semi-statically configuring the fixed time domain interval by a first node.

Optionally, the indication module 24 is further used for determining the unfixed time domain interval according to a link type.

It is to be noted that in the embodiment of the present disclosure, the multiple first time units are continuous in time domain; or the multiple first time units are discontinuous in time domain. The frame structure includes one or more first formats.

Optionally, the link type is indicated by the frame structure. The link type includes at least one of a wireless backhaul link; an access link; a non-backhaul link; a non-access link; a direct link; a non-direct link; a link between an a-th hop node and a b-th hop node, where a and b are positive integers greater than or equal to 1; or a link between a first node and a target node, where the first node includes at least one of a base station or a relay node, and the target node includes at least one of a base station, a relay node, or a terminal. The backhaul link includes at least one of a link between a base station and a relay node or a link between relay nodes. The access link includes a link between a relay node and a terminal. The direct link includes a link between a base station and a terminal.

Optionally, the first determination module 22 is further used for determining the first format in at least one of the following manners: predefinition by a system; or semi-static configuration by a first node.

Optionally, the first determination module is further used for determining the number of the second time units included in the first format in at least one of the following manners: predefinition by a system; or semi-static configuration by a first node.

Figure 4:
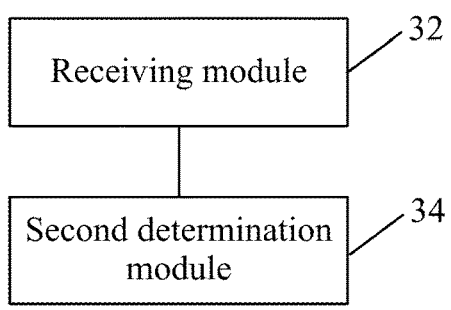
FIG. 4 is an optional block diagram illustrating the structure of a device for determining a frame structure according to an embodiment of the present disclosure.

FIG. 4 is a block diagram of a device for determining a frame structure according to an embodiment of the present disclosure. As shown in FIG. 4, the device may include a receiving module 32 used for receiving indication of a frame structure of one or multiple first time units; and a second determination module 34 used for determining the frame structure of the one or multiple first time units according to the indication of the frame structure.

A transmission direction on the one or multiple first time units is indicated by the frame structure. The transmission direction may be downlink transmission, uplink transmission, or flexible direction.

Through a comprehensive effect of each preceding module, indication of the frame structure of the one or multiple first time units is received, and the frame structure of the one or multiple first time units is determined according to the indication of the frame structure. In this manner, the problem that different frame structures cannot be accurately indicated in the related art is solved.

It is to be noted that the receiving module 32 in the embodiment may be used for performing S202 in foregoing embodiment of the present disclosure and the second determination module 34 in the embodiment may be used for performing S204 in forgoing embodiment of the present disclosure. The examples and application scenarios implemented by the preceding modules and corresponding steps are the same but are not limited to the content disclosed in the preceding embodiments.

Optionally, the first time unit include one or more second time units. The receiving module 32 is further used for receiving a number of the second time units which is predefined by a system; or receiving a number of the second time units which is semi-statically configured by a first node.

It is to be noted that in the embodiment of the present disclosure, the multiple first time units are continuous in time domain; or the multiple first time units are discontinuous in time domain.

It is to be noted that in the embodiment of the present disclosure, the second time units included in the first time unit are continuous in time domain; or the second time units included in the first time unit are discontinuous in time domain.

It is to be noted that in the embodiment of the present disclosure, the frame structure includes one or more first formats.

Optionally, the second determination module 34 is further used for determining the number of the first time units included in the frame structure in at least one of the following manners: predefinition by a system; semi-static configuration by a first node; or dynamic indication by a second node.

The first node includes at least one of a base station or a relay node. The second node includes at least one of a base station or a relay node.

It is to be noted that in the embodiment of the present disclosure, a time domain interval between any two adjacent first time units in the multiple first time units includes at least one of a fixed time domain interval or an unfixed time domain interval.

Optionally, the second determination module 34 is further used for predefining the fixed time domain interval by a system or semi-statically configuring the fixed time domain interval by a first node.

Optionally, the second determination module 34 is further used for determining the unfixed time domain interval according to a link type.

Optionally, the receiving module 32 is further used for receiving indication of the link type by the frame structure.

Optionally, the receiving module 32 is further used for receiving the first format determined in at least one of the following manners: predefinition by a system; or semi-static configuration by a first node.

Optionally, the receiving module 32 is further used for receiving a number of the second time units included in the first format, where the number of the second time units is determined in at least one of the following manners: predefinition by a system; or semi-static configuration by a first node.

Embodiments of the present disclosure further provide a storage medium. A computer program is stored in the storage medium. When the computer program is executed, the steps in any one of the preceding method embodiments are performed.

Optionally, in an embodiment, the preceding storage medium may be configured to store a computer program for executing the steps described below.

In S1, one or multiple first time units are determined.

In S2, a frame structure of the one or multiple first time units is indicated.

Optionally, in the embodiment, the preceding program is used for performing the steps described below.

In S3, a number of second time units included in the first time unit is predefined by a system; or the number of the second time units included in the first time unit is semi-statically configured by a first node.

It is to be noted that in the embodiment of the present disclosure, the multiple first time units are continuous in time domain; or the multiple first time units are discontinuous in time domain.

It is to be noted that in the embodiment of the present disclosure, the second time units included in the first time unit are continuous in time domain; or the second time units included in the first time unit are discontinuous in time domain. It is to be noted that in the embodiment of the present disclosure, the frame structure includes one or more first formats.

In S4, a number of the first time units included in the frame structure is determined in one of the following manners: predefinition by a system; semi-static configuration by a first node; or dynamic indication by a second node.

The first node includes at least one of a base station or a relay node. The second node includes at least one of a base station or a relay node.

It is to be noted that in the embodiment of the present disclosure, a time domain interval between any two adjacent first time units in the multiple first time units includes at least one of a fixed time domain interval or an unfixed time domain interval.

In S5, the fixed time domain interval is predefined by a system or semi-statically configured by a first node.

In S6, the unfixed time domain interval is determined according to a link type.

In S7, the first format is determined in at least one of the following manners: predefinition by a system; or semi-static configuration by a first node.

In S8, the number of the second time units included in the first format is determined in at least one of the following manners: predefinition by a system; or semi-static configuration by a first node.

Embodiments of the present disclosure further provide another storage medium. A computer program is stored in the storage medium. When the computer program is executed, the steps in any one of the preceding method embodiments are performed.

Optionally, in an embodiment, the preceding storage medium may be configured to store a computer program for executing the steps described below.

In S1, indication of a frame structure of one or multiple first time units is received.

In S2, the frame structure of the one or multiple first time units is determined according to the indication of the frame structure.

Optionally, in the embodiment, the preceding program is used for performing the steps described below.

In S3, a number of second time units predefined by a system is acquired; or the number of the second time units semi-statically configured by a first node is received.

It is to be noted that in the embodiment of the present disclosure, the multiple first time units are continuous in time domain; or the multiple first time units are discontinuous in time domain.

It is to be noted that in the embodiment of the present disclosure, the second time units included in the first time unit are continuous in time domain; or the second time units included in the first time unit are discontinuous in time domain.

It is to be noted that in the embodiment of the present disclosure, the frame structure includes one or more first formats.

In S4, a number of the first time units included in the frame structure is determined in one of the following manners: predefinition by a system; semi-static configuration by a first node; or dynamic indication by a second node.

The first node includes at least one of a base station or a relay node. The second node includes at least one of a base station or a relay node.

It is to be noted that in the embodiment of the present disclosure, a time domain interval between any two adjacent first time units in the multiple first time units includes at least one of a fixed time domain interval or an unfixed time domain interval. In S5, the fixed time domain interval predefined by a system or semi-statically configured by a first node is acquired.

In S6, the unfixed time domain interval is determined according to a link type.

In S7, indication of the link type by the frame structure is received.

In S8, the first format is determined in at least one of the following manners: predefinition by a system; or semi-static configuration by a first node.

In S9, a number of the second time units included in the first format is received, where the number of the second time units is determined in at least one of the following manners: predefinition by a system; or semi-static configuration by a first node.

Embodiments of the present disclosure further provide a processor. The processor is configured to execute a computer program to perform the steps in any one of the preceding method embodiments.

In S1, one or multiple first time units are determined.

In S2, a frame structure of the one or multiple first time units is indicated.

Optionally, in an embodiment, the preceding program is used for performing the steps described below.

In S3, a number of second time units included in the first time unit is predefined by a system; or the number of the second time units included in the first time unit is semi-statically configured by a first node.

It is to be noted that in the embodiment of the present disclosure, the multiple first time units are continuous in time domain; or the multiple first time units are discontinuous in time domain.

It is to be noted that in the embodiment of the present disclosure, the second time units included in the first time unit are continuous in time domain; or the second time units included in the first time unit are discontinuous in time domain.

It is to be noted that in the embodiment of the present disclosure, the frame structure includes one or more first formats.

In S4, a number of the first time units included in the frame structure is determined in one of the following manners: predefinition by a system; semi-static configuration by a first node; or dynamic indication by a second node.

The first node includes at least one of a base station or a relay node. The second node includes at least one of a base station or a relay node.

It is to be noted that in the embodiment of the present disclosure, a time domain interval between any two adjacent first time units in the multiple first time units includes at least one of a fixed time domain interval or an unfixed time domain interval.

In S5, the fixed time domain interval is predefined by a system or semi-statically configured by a first node.

In S6, the unfixed time domain interval is determined according to a link type.

In S7, the first format is determined in at least one of the following manners: predefinition by a system; or semi-static configuration by a first node.

In S8, a number of the second time units included in the first format is determined in at least one of the following manners: predefinition by a system; or semi-static configuration by a first node.

Embodiments of the present disclosure further provide another processor. The processor is configured to execute a computer program to perform the steps in any one of the preceding method embodiments.

In S1, indication of a frame structure of one or multiple first time units is received.

In S2, the frame structure of the one or multiple first time units is determined according to the indication of the frame structure.

Optionally, in an embodiment, the preceding program is used for performing the steps described below.

In S3, a number of second time units predefined by a system is acquired; or the number of the second time units semi-statically configured by a first node is received.

It is to be noted that in embodiments of the present disclosure, the multiple first time units are continuous in time domain; or the multiple first time units are discontinuous in time domain.

It is to be noted that in embodiments of the present disclosure, the second time units included in the first time unit are continuous in time domain; or the second time units included in the first time unit are discontinuous in time domain.

It is to be noted that in embodiments of the present disclosure, the frame structure includes one or more first formats.

In S4, a number of the first time units included in the frame structure is determined in one of the following manners: predefinition by a system; semi-static configuration by a first node; or dynamic indication by a second node.

The first node includes at least one of a base station or a relay node. The second node includes at least one of a base station or a relay node.

It is to be noted that in the embodiment of the present disclosure, a time domain interval between any two adjacent first time units in the multiple first time units includes at least one of a fixed time domain interval or an unfixed time domain interval.

In S5, the fixed time domain interval predefined by a system or semi-statically configured by a first node is acquired.

In S6, the unfixed time domain interval is determined according to a link type.

In S7, indication of the link type by the frame structure is received.

In S8, the first format is determined in at least one of the following manners: predefinition by a system; or a semi-static configuration by a first node.

In S9, a number of the second time units included in the first format is received, where the number of the second time units is determined in at least one of the following manners: predefinition by a system; or semi-static configuration by a first node.

Optional embodiments below are used in conjunction with the preceding embodiments to describe the preceding method but are not intended to limit the scope of embodiments of the present disclosure.

Optional Embodiment One (1) Indicating Multiple Discontinuous Subframes

When an upper node (equivalent to the first node in the preceding embodiments) indicates a frame structure to a target node (equivalent to the second node in the preceding embodiments), the upper node may indicate frame structures of multiple discontinuous subframes. The upper node may be a base station or a relay node. The target node may be a base station or a relay node.

It is to be noted that the upper node is equivalent to the first node in the claims, and the target node is equivalent to the second node in the claims.

If multiple discontinuous subframes are indicated, the specific indication is as follows. The target node receives a frame structure indication in subframe n, if the frame structure indication includes m slot formats, where m>1, the m slot formats in the frame structure indication can indicate the frame structures of m discontinuous slots. After the target node receives the frame structure indication, which slots the indicated m slots specifically are can be determined in at least one of the manners below.

Figure 5:
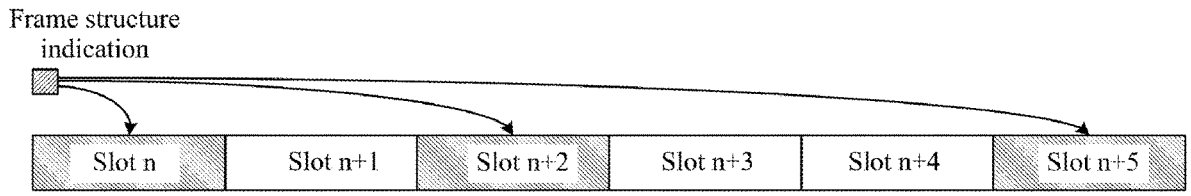
FIG. 5 is optional schematic diagram one indicating multiple discontinuous subframes according to an optional embodiment of the present disclosure.

1. A determination is made according to a link type. If the frame structure indication corresponds to link type 1, the frame structures of the m slots respectively correspond to the frame structures of m link type 1 subframes starting from subframe n or from a specific subframe. The link type 1 may be a backhaul link, an access link, a link between the upper node and the target node or a link between a specific node and the target node. Using m=3 as an example, schematic diagram one indicating multiple discontinuous subframes is shown in FIG. 5.

2. The target node learns the link type according to predefinition by a system or semi-static configuration by another node. The link type may be at least one of a backhaul link; an access link; a non-backhaul link; a non-access link; a direct link; a non-direct link; or a link between specific-hop node a and specific-hop node b.

3. A determination is made according to slot indexes. The m slot formats in the frame structure indication correspond to m slots starting from subframe n or from a specific subframe and spaced apart from each other at a fixed subframe interval of x, such as {slot n, slot n+x, . . . , slot n+(m−1)*x}.

Figure 6:
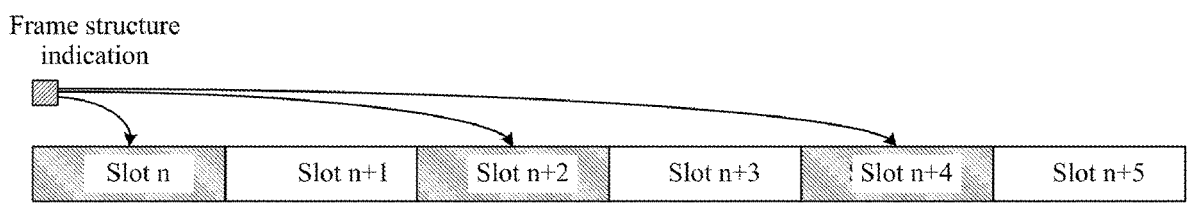
FIG. 6 is optional schematic diagram two indicating multiple discontinuous subframes according to an optional embodiment of the present disclosure.

The subframe interval x may be predefined by a system or semi-statically configured for a target node by another node. Using m=3 as an example, schematic diagram two indicating multiple discontinuous subframes is shown in FIG. 6.

Optional Embodiment Two (2) Indicating Multiple OFDM Symbol Clusters

When an upper node indicates a frame structure to a target node, the upper node may indicate frame structures of multiple OFDM symbol clusters. The indicated multiple OFDM symbol clusters may be continuous or discontinuous. The numbers of symbols included in respective OFDM symbol clusters may be the same or different. The target node receives a frame structure indication in subframe n, and the frame structure indication received by this target node indicates the frame structures of m OFDM symbol clusters, where m≥1. The target node determines, according to at least one of the following, the frame structures of which OFDM symbol clusters are indicated by the frame structure indication.

Figure 7:
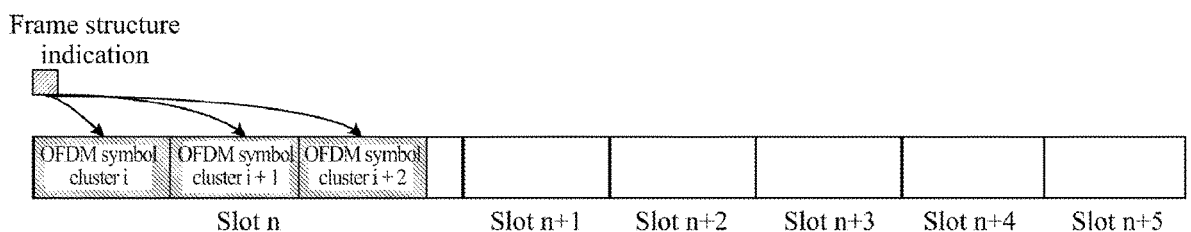
FIG. 7 is optional schematic diagram one indicating multiple OFDM symbol clusters according to an optional embodiment of the present disclosure.

The size of one OFDM symbol cluster is predefined by a system or semi-statically configured by another node. Semi-static configuration by another node may include semi-static configuration by the first node. For example, one OFDM symbol cluster includes x OFDM symbols, where x≥1. The m OFDM symbol clusters indicated by the frame structure indication correspond to m continuous OFDM symbol clusters starting from subframe n, from the first OFDM symbol of a specific subframe or from a specific OFDM symbol. Using m=3 as an example, the frame structure indication of {OFDM symbol cluster i, OFDM symbol cluster i+1, OFDM symbol cluster i+2} is shown in FIG. 7, which is schematic diagram one of indicating multiple OFDM symbol clusters.

The m OFDM symbol clusters indicated by the frame structure indication correspond to m discontinuous OFDM symbol clusters starting from subframe n, from the first OFDM symbol of a specific subframe, from a specific OFDM symbol, from the first OFDM symbol cluster or from a specific OFDM symbol cluster. Although the m symbol clusters are discontinuous, they are equally spaced. An interval may be measured by OFDM symbols or OFDM symbol clusters. The interval may be predefined by a system or semi-statically configured by another node to be y OFDM symbols or y OFDM symbol clusters, where y≥1.

Figure 8:
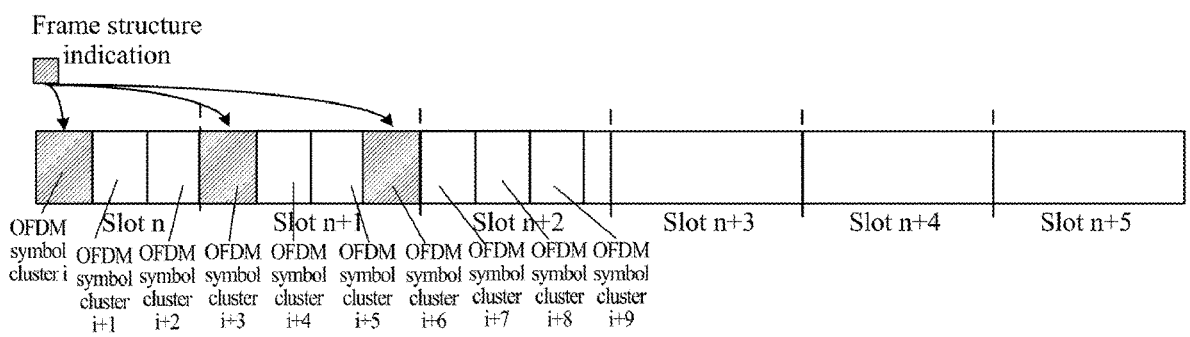
FIG. 8 is optional schematic diagram two indicating multiple OFDM symbol clusters according to an optional embodiment of the present disclosure.

Using m=3 as an example, the frame structure indication of {OFDM symbol cluster i, OFDM symbol cluster i+y, OFDM symbol cluster i+2*y}, with y being the number of OFDM symbol clusters, is shown in FIG. 8, which is schematic diagram two of indicating multiple OFDM symbol clusters.

Figure 9:
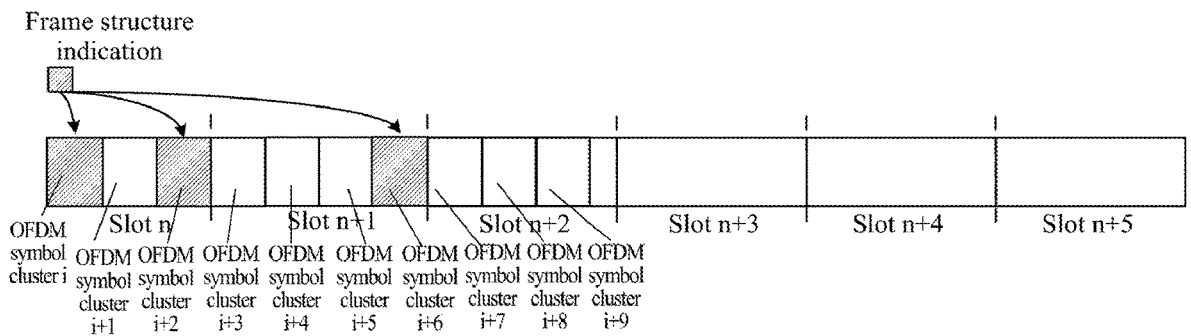
FIG. 9 is optional schematic diagram three indicating multiple OFDM symbol clusters according to an optional embodiment of the present disclosure.

The m OFDM symbol clusters indicated by the frame structure indication correspond to m OFDM symbol clusters starting from subframe n, or from the first OFDM symbol of a specific subframe, or from a specific OFDM symbol, or from the first OFDM symbol cluster or from a specific OFDM symbol cluster. The m OFDM symbol clusters may be continuous or discontinuous. If they are discontinuous, they may be equally spaced or unequally spaced and correspond to the same link type. If the frame structure indication is of link type 1, the m OFDM symbol clusters correspond to m OFDM symbol clusters of link type 1, which start from subframe n, or from the first OFDM symbol of a specific subframe or from a specific OFDM symbol, where the m OFDM symbol clusters may be continuous or discontinuous. Using m=3 as an example, schematic diagram three of indicating multiple OFDM symbol clusters is shown in FIG. 9.

The target node learns the link type according to predefinition by a system or semi-static configuration by another node. The link type may be at least one of a backhaul link; an access link; a non-backhaul link; a non-access link; a direct link; a non-direct link; or a link between specific-hop node a and specific-hop node b.

The link type 1 is one of the preceding link types.

Optional Embodiment Three (3) Indicating Multiple OFDM Symbols

When an upper node indicates a frame structure to a target node, the upper node may indicate frame structures of multiple OFDM symbols. The indicated multiple OFDM symbols may be continuous or discontinuous and may be the same or different. The target node receives a frame structure indication in subframe n, and the frame structure indication indicate the frame structures of m OFDM symbols, where m≥1. The target node determines, according to at least one of the following, the frame structures of which OFDM symbols are indicated by the frame structure indication.

Figure 10:
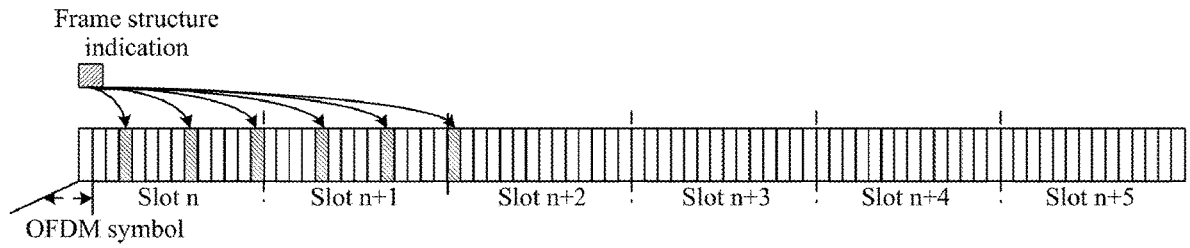
FIG. 10 is optional schematic diagram one indicating multiple OFDM symbols according to an optional embodiment of the present disclosure.

If the m symbols are discontinuous, where the interval between former and latter OFDM symbols is x OFDM symbols, then the size of the interval x may be predefined by a system or semi-statically configured by another node, where x≥1. For example, the m OFDM symbols indicated by the frame structure indication correspond to m equally spaced discontinuous OFDM symbols starting from subframe n, the first OFDM symbol of a specific subframe or a specific OFDM symbol. Using m=6 and interval x=4 as an example, the frame structure indication of {OFDM symbol cluster i, OFDM symbol cluster i+x, OFDM symbol cluster i+2*x, OFDM symbol cluster i+3*x, OFDM symbol cluster i+4*x, OFDM symbol cluster i+5*x} is shown in FIG. 10, which is schematic diagram one of indicating multiple OFDM symbols.

Figure 11:
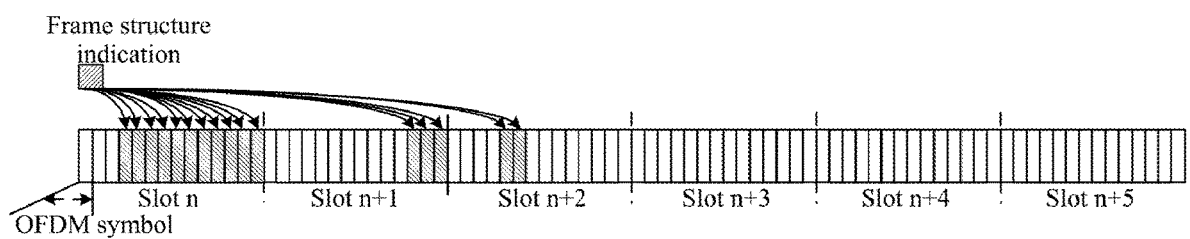
FIG. 11 is optional schematic diagram two indicating multiple OFDM symbols according to an optional embodiment of the present disclosure.

If the m symbols are discontinuous, the frame structures of which OFDM symbols are indicated by the frame structure indication are determined according to the type link. If the frame structures indication corresponds to link type 1, the m OFDM symbols indicated by the frame structure indication respectively correspond to the frame structures of the m OFDM symbols of link type 1, which start from subframe n, the first OFDM symbol of a specific subframe or a specific OFDM symbol. They may be m continuous OFDM symbols or m discontinuous OFDM symbols. Using m=16 as an example, schematic diagram two of indicating multiple OFDM symbols is shown in FIG. 11.

The target node learns the link type according to predefinition by a system or semi-static configuration by another node. The link type may be at least one of a backhaul link; an access link; a non-backhaul link; a non-access link; a direct link; a non-direct link; or a link between specific-hop node a and specific-hop node b.

The link type 1 is one of the preceding link types.

Optional Embodiment Four (4) A New SFI Format Corresponding to Continuous OFDM Symbols A time unit, for which a frame structure is configured, is multiple OFDM symbols. How many OFDM symbols are included in the time unit may be predefined by a system or semi-statically configured by a specific node. For example, if it is predefined by a system or semi-statically configured by a specific node that 4 OFDM symbols are included in the time unit, one frame structure format can indicate transmission attributes of the 4 OFDM symbols, and the 4 OFDM symbols are continuous.

Optional Embodiment Five (5) A New SFI Format Corresponding to Discontinuous OFDM Symbols A time unit, for which a frame structure is configured, is multiple OFDM symbols. How many OFDM symbols are included in the time unit may be predefined by a system or semi-statically configured by a specific node. For example, if it is predefined by a system or semi-statically configured by a specific node that 4 OFDM symbols are included in the time unit, one frame structure format can indicate transmission attributes of the 4 OFDM symbols, and the frame structure indication of one time unit can indicate 4 continuous or discontinuous OFDM symbols.

Figure 12:
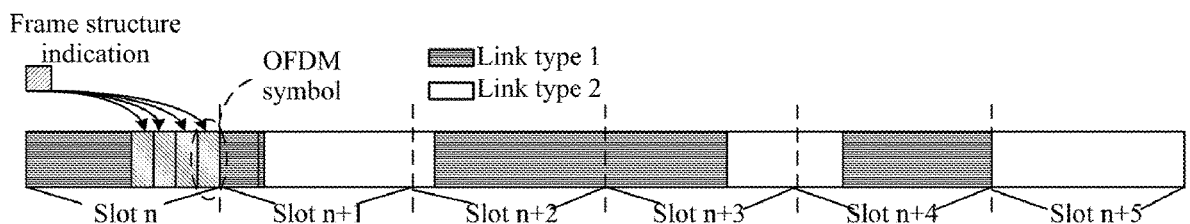
FIG. 12 is optional schematic diagram one of continuous OFDM symbols corresponding to a new SFI format according to an optional embodiment of the present disclosure.
Figure 13:
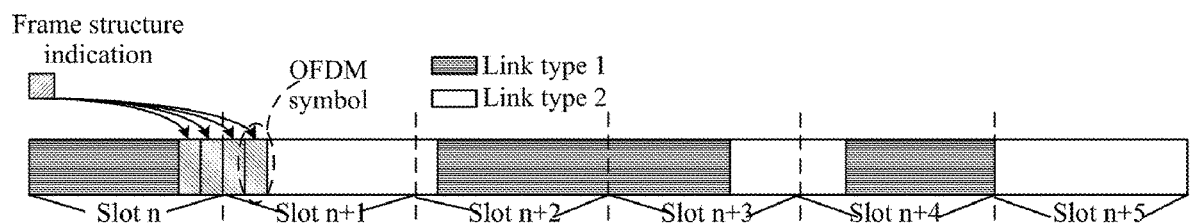
FIG. 13 is optional schematic diagram two of continuous OFDM symbols corresponding to a new SFI format according to an optional embodiment of the present disclosure.

From the OFDM symbol valid as indicated by the frame structure indication, when the number of continuous OFDM symbols satisfying a specific link type is not less than 4 OFDM symbols, then for the frame structure indication of one time unit, the transmission attributes of 4 continuous OFDM symbols can be indicated. See schematic diagram one as shown in FIG. 12 in which a new SFI format corresponding to continuous OFDM symbols or schematic diagram two as shown in FIG. 13 in which a new SFI format corresponding to continuous OFDM symbols. The difference between FIG. 12 and FIG. 13 is whether the indicated 4 OFDM symbols cross a slot boundary.

Figure 14:
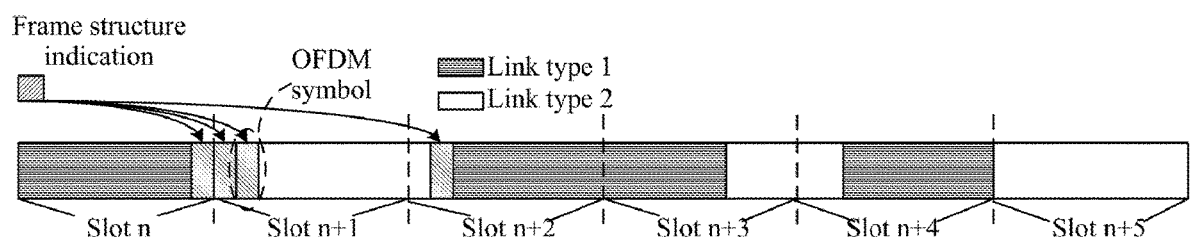
FIG. 14 is optional schematic diagram three of discontinuous OFDM symbols corresponding to a new SFI format according to an optional embodiment of the present disclosure.

From the OFDM symbol valid as indicated by the frame structure indication, when the number of continuous OFDM symbols satisfying a specific link type is less than 4 OFDM symbols, then for a frame structure indication of one time unit, the transmission attributes of 4 discontinuous OFDM symbols can be indicated. The former part of the 4 OFDM symbols indicates the transmission attributes of multiple continuous OFDM symbols ranging from the start symbol indicated by the frame structure until OFDM symbols that satisfy the specific link type end. If the former part indicates x OFDM symbols, the latter part of the 4 OFDM symbols indicates 4−x continuous OFDM symbols which satisfy the specific link type and start from the start OFDM symbol of a next segment of time domain resources, where x<4. In FIG. 12, x=3, and schematic diagram three of a new SFI format corresponding to discontinuous OFDM symbols is shown in FIG. 14.

Apparently, it is to be understood by those skilled in the art that the one or more modules or the one or more steps in embodiments of the present disclosure may be implemented by a general-purpose computing device and may be concentrated on a single computing device or distributed in a network formed by multiple computing devices. Optionally, these modules or steps may be implemented by program codes executable by the computing device. Thus, these modules or steps may be stored in a storage device and executed by the computing device. Moreover, in some cases, the illustrated or described steps may be executed in a sequence different from the sequence described herein. Alternatively, each module or step may be implemented by being made into an integrated circuit module separately or multiple ones of these modules or steps may be implemented by being made into a single integrated circuit module. In this manner, the present disclosure is not limited to any specific combination of hardware and software.

What is claimed is:

1. A method for indicating a frame structure, applied to a first node in a wireless communication system, wherein the wireless communication system comprises the first node and a target node, wherein the first node comprises at least one of a base station or a relay node, and the target node comprises at least one of a base station, a relay node or a terminal, wherein the method comprises:
    determining one or a plurality of first time units; and
    indicating the frame structure of the one or the plurality of first time units;
    wherein a transmission direction on the one or the plurality of first time units is indicated by the frame structure, the transmission direction comprises downlink transmission, uplink transmission or flexible direction;
    wherein a time domain interval between any two adjacent first time units of the plurality of first time units comprises at least one of a fixed time domain interval or an unfixed time domain interval, wherein each first time unit of the one or the plurality of first time units comprises a slot; and
    wherein the fixed time domain interval is predefined by the wireless communication system or is semi-statically configured by the first node, and the unfixed time domain interval is determined according to a link type.

2. The method of claim 1, further comprising:
    predefining, by the wireless communication system, a number of second time units comprised in the each first time unit; or
    semi-statically configuring, by the first node, the number of the second time units comprised in the each first time unit;
    wherein each of the second time units comprises at least one of: an orthogonal frequency-division multiplexing (OFDM) symbol cluster, or an OFDM symbol, wherein the OFDM symbol cluster comprises multiple OFDM symbols.

3. The method of claim 1, wherein the plurality of first time units are discontinuous in time domain.

4. The method of claim 2, wherein
    the second time units comprised in the each first time unit are continuous in time domain; or
    the second time units comprised in the each first time unit are discontinuous in time domain.

5. The method of claim 1, wherein the frame structure comprises a first format.

6. The method of claim 1, further comprising:
    determining a number of the plurality of first time units comprised in the frame structure in one of following manners:
    predefinition by the wireless communication system;
    semi-static configuration by the first node; or
    dynamic indication by a second node;
    wherein the second node comprises at least one of a base station or a relay node.

7. The method of claim 1, wherein the link type comprises at least one of:

a wireless backhaul link, wherein the wireless backhaul link comprises at least one of a link between a base station and a relay node or a link between relay nodes;
an access link, wherein the access link comprises a link between a relay node and a terminal;
a non-backhaul link;
a non-access link;
a direct link, wherein the direct link comprises a link between a base station and a terminal;
a non-direct link;
a link between an a-th hop node and a b-th hop node, wherein a and b are positive integers greater than or equal to 1; or
a link between the first node and the target node.

8. The method of claim 1, further comprising: indicating the link type by the frame structure, wherein the link type comprises at least one of:
a wireless backhaul link, wherein the wireless backhaul link comprises at least one of a link between a base station and a relay node or a link between relay nodes;
an access link, wherein the access link comprises a link between a relay node and a terminal;
a non-backhaul link;
a non-access link;
a direct link, wherein the direct link comprises a link between a base station and a terminal;
a non-direct link;
a link between an a-th hop node and a b-th hop node, wherein a and b are positive integers greater than or equal to 1; or
a link between the first node and the target node.

9. The method of claim 5, further comprising determining the first format in at least one of the following manners:
predefinition by the wireless communication system; or
semi-static configuration by the first node.

10. The method of claim 5, further comprising determining a number of second time units comprised in the first format in at least one of the following manners:
predefinition by the wireless communication system; or
semi-static configuration by the first node.

11. A non-transitory storage medium storing a computer program, wherein when the computer program is executed by a processor, the method of claim 1 is performed.

12. A method for determining a frame structure, applied to a relay node or a terminal comprised in a target node in a wireless communication system, wherein the wireless communication system comprises the target node and a first node, wherein the target node comprises at least one of a base station, the relay node or the terminal, and the first node comprises at least one of a base station or a relay node, wherein the method comprises:
receiving an indication of the frame structure of one or a plurality of first time units;
determining the frame structure of the one or a plurality of first time units according to the indication of the frame structure;
wherein a transmission direction on the one or a plurality of first time units is indicated by the frame structure, the transmission direction comprises downlink transmission, uplink transmission or flexible direction;
wherein a time domain interval between any two adjacent first time units of the plurality of first time units comprises at least one of a fixed time domain interval or an unfixed time domain interval, wherein each first time unit of the one or the plurality of first time units comprises a slot; and
wherein the fixed time domain interval is predefined by the wireless communication system or is semi-statically configured by the first node, and the unfixed time domain interval is determined according to a link type.

13. The method of claim 12, wherein the each first time unit comprises one or more second time units, and the method further comprises:
acquiring a number of the second time units which is predefined by the wireless communication system; or
receiving the number of the second time units which is semi-statically configured by the first node;
wherein each of the second time units comprises at least one of: an orthogonal frequency-division multiplexing (OFDM) symbol cluster, or an OFDM symbol, wherein the OFDM symbol cluster comprises multiple OFDM symbols.

14. The method of claim 12, further comprising: receiving an indication of the link type by the frame structure; wherein the link type comprises at least one of:
a wireless backhaul link, wherein the wireless backhaul link comprises at least one of a link between a base station and a relay node or a link between relay nodes;
an access link, wherein the access link comprises a link between a relay node and a terminal;
a non-backhaul link;
a non-access link;
a direct link, wherein the direct link comprises a link between a base station and a terminal;
a non-direct link;
a link between an a-th hop node and a b-th hop node, wherein a and b are positive integers greater than or equal to 1; or
a link between the first node and the target node.

15. A non-transitory storage medium storing a computer program, wherein when the computer program is executed by a processor, the method of claim 12 is performed.

16. An electronic device, disposed on a first node in a wireless communication system, wherein the wireless communication system comprises the first node and a target node, wherein the first node comprises at least one of a base station or a relay node, and the target node comprises at least one of a base station, a relay node or a terminal, wherein the electronic device comprises a memory and a processor, wherein a computer program is stored in the memory, and the processor is configured to execute the computer program to perform a method for indicating a frame structure, wherein the method comprises:
determining one or a plurality of first time units; and
indicating the frame structure of the one or a plurality of first time units;
wherein a transmission direction on the one or a plurality of first time units is indicated by the frame structure, the transmission direction comprises downlink transmission, uplink transmission or flexible direction;
wherein a time domain interval between any two adjacent first time units of the plurality of first time units comprises at least one of a fixed time domain interval or an unfixed time domain interval, wherein each first time unit of the one or the plurality of first time units comprises a slot; and
wherein the fixed time domain interval is predefined by the system or is semi-statically configured by the first node, and the unfixed time domain interval is determined according to a link type.

17. An electronic device, comprising a memory and a processor, wherein a computer program is stored in the memory, and the processor is configured to execute the computer program to perform the method of claim 12.

* * * * *